United States Patent
Bridgelall

(10) Patent No.: US 7,447,479 B2
(45) Date of Patent: Nov. 4, 2008

(54) DUAL TRANSCEIVER MODULE FOR USE WITH IMAGER AND VIDEO CAMERAS

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1970 days.

(21) Appl. No.: 10/056,408

(22) Filed: Jan. 24, 2002

(65) Prior Publication Data

US 2003/0110508 A1  Jun. 12, 2003

(51) Int. Cl.
H04B 5/00 (2006.01)
(52) U.S. Cl. ..................... 455/41; 455/414.1
(58) Field of Classification Search .............. 455/41, 455/414.1
See application file for complete search history.

(56) References Cited

U.S. PATENT DOCUMENTS 6,643,522 B1 * 11/2003 Young ................. 455/552.1
6,842,462 B1 * 1/2005 Ramjee et al. ............ 370/466

* cited by examiner

Primary Examiner—Creighton H Smith
(74) Attorney, Agent, or Firm—Kirschstein, et al.

(57) ABSTRACT

A video imager processor and two radio frequency transceivers are supported on a common support having a predetermined form factor, such as that of a Compact Flash card commonly utilized in mobile computers. Common digital processing circuitry is used for processing the baseband signal from the RF transceivers, making a highly integrated and compact arrangement.

9 Claims, 1 Drawing Sheet

DUAL TRANSCEIVER MODULE FOR USE WITH IMAGER AND VIDEO CAMERAS

REFERENCE TO RELATED APPLICATION

Figure 1:
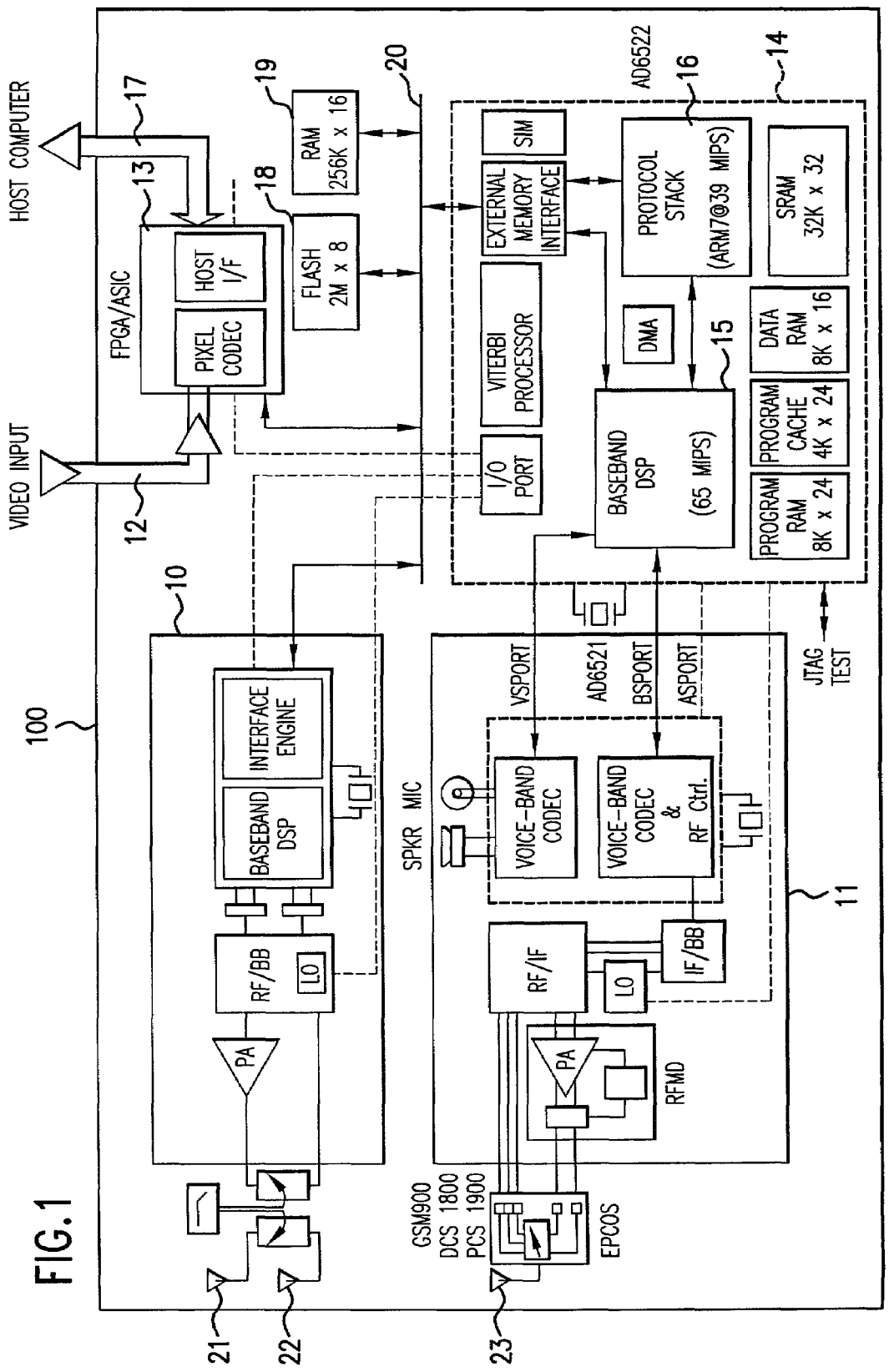

This application is related to U.S. patent application Ser. No. 09/843,946 filed Apr. 30, 2001, and U.S. patent application Ser. No. 09/939,861, filed Aug. 27, 2001.

BACKGROUND OF THE INVENTION

Field of the Invention

The present invention generally relates to mobile audio/video cameras or audio/video equipped computers, and RF communications modules or cards for use in such computers, and methods of utilizing baseband processor circuitry in such modules to achieve multi-radio capabilities in a small, compact form factor by making dual use of such circuitry in each radio.

Wireless networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local or wide area network, including, optionally, one or more servers or host computer systems, or gateways to the public switched telephone network.

Wireless and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial coverage and layout, response time, and loading requirements of the network, different modulation schemes, power limitations, and communication protocols have been designed so as to most efficiently regulate the communications between a given terminal and the network through the selected access point. For local area networks, one such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard"), and in the Personal Communication Service area, another is a wide area network standard (WCDMA).

There are a variety of currently deployed and emerging wireless communications standards for cellular voice and data communications, often referred to as "wide area networks" (WANs) to distinguish them from local area networks. First generation wireless systems (1G) utilized analog technology. Second generation (2G) systems, using digital technology, were introduced in the mid 1990s including GSM, or the "global system for mobile communications", and CDPD or "cellular digital packet data". GSM utilizes time division multiplying over a 200 kHz channel. CDPC transmits data over dedicated 30 kHz cellular channels at speeds up to 19.2 kbps. Systems referred to a 2.5G offer mobile data services at rates from 56 kbps to 144 kbps, while 3G systems will operate at data rates from 144 kbps to 2 Mbps.

One of the most important technologies for wireless communications is CDMA. In a spread spectrum system, one can multiplex users by assigning them different spreading keys, which is called a code division multiple access (CDMA) system. The CDMA modulation technique is one of several techniques for facilitating communications in which a large number of system users are present in the coverage area of a base station. The use of narrowband CDMA in a digital cellular spread spectrum communications system was adopted by the Telecommunication Industry Association in 1993 as TIA/EIA standard IS-95.

Currently deployed 800, 900 MHz band systems include AMPS, TDMA/IS-136, CDMA/IS-95, iDEN, GSM, and I-mode. Other emerging network standards include cdmaOne, CDMA 1X, and 1XEV DV (in which voice and data share a 1.25 MHz channel). There are several technologies that fall under terminology of 2.5G. For example, 1XRTT is the technology for upgrading CDMA networks. Another widely discussed 2.5G technology is GPRS (the General Packet Radio Service), intended for upgrading GSM networks. GPRS was initially deployed in 2000 and operates using multiple time slots that can each carry data at 1s4.4 kbps.

Other multiple access communication system techniques, such as time divisional multiple access (TDMA), frequency divisional multiple access (FDMA) and AM modulation schemes such as amplitude companded single sideband (AC-SSB) are known in the art. The use of CDMA techniques in a multiple access communication system is disclosed in U.S. Pat. No. 4,901,307. The framing and transmission of data using the Internet Protocol (IP) over a CDMA wireless network is described in TIA/EIA/IS-707-A, entitled "Data Service Options for Spread Spectrum Systems", referred to as IS-707.

The International Telecommunications Union recently made a call for proposals for methods of providing high rate data and high quality services over wireless communications channels. A first of these proposals was prepared by the Telecommunication Industry Association, entitled "The cdma2000 ITU-R RTT Candidate Submission", often referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as wideband CDMA or W-CDMA. A third proposal was submitted by U.S. TG 8/1 entitled "The UWC-136 Candidate Submission", and is referred to as EDGE.

EDGE is an acronym for "Enhanced Data for GSM Evolution". EDGE is an enhanced modulation technique that is backward compatible with GSM networks, and provides throughput three times that of GPRS. The contents of these submissions are public record and are known in the art.

One important future network is UMTS/IMT2000. The UMTS Forum is a non-profit organization established in 1996 to increase awareness of the UMTS/IMT-2000 third-generation mobile communications systems. In establishing the forum, members intended to create a standard for 3G applications and services that would be globally interoperable and can be accessed by any mobile device from anywhere in the world. Universal Mobile Telecommunications System (UMTS) is a service based on the global system for mobile (GSM) communications standard.

One type of mobile computer terminal coupled to or incorporating a bar code symbol reader, are now very common for data collection applications. Typically, a bar code symbol comprises one or more rows of light and dark regions, typically in the form of rectangle. The relative widths of the dark regions, i.e., the bars and/or the widths of the light regions, i.e., the spaces, between the bars encode data or information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient taking of inventories, tracking of work in progress, etc.

A variety of bar code reader scanning systems are known. One particularly advantageous type of reader is an optical scanner which scans a beam of light, such as a laser beam, across the symbols. Moving beam laser scanner systems and components of the type are exemplified by U.S. patent application Ser. Nos. 09/305,463, filed May 6, 1999; Ser. No. 09/275,858, filed Mar. 24, 1999; Ser. No. 09/637,831 filed Aug. 11, 2000; and Ser. No. 08/949,494 filed Oct. 14, 1997 which are owned by the assignee of the instant invention and are incorporated by reference herein. Moving beam laser scanners are not the only type of optical instrument capable of reading symbols. Another type of reader referred to as an "imager," is one which incorporates tow dimensional solid state sensor or linear charge coupled device (CCD) technology. The entire symbol is flooded with light from a light source such as a light emitting diode (LED) in the scanning device, and each pixel or CCD cell is sequentially read out to determine the presence of, for example, a bar or a space. As an example of a CCD reader, U.S. patent application Ser. No. 09/096,578, filed Jun. 12, 1998, of Correa et al. is hereby incorporated by reference.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software to remove noise, adjust the dynamic range, or compensate for signal non-uniformities. Samples may then be taken of the analog signal, and applied to an analog-to-digital converter to convert the samples to digital data. See, for example, U.S. Pat. No. 6,170,749, which is hereby incorporated by reference. Alternatively, analog circuitry may be used to digitize the shape of the signal. The digital samples or the pulse width modulated digitized signal is applied to a software algorithm, which attempts to decode the data in the signal to characters in the symbology. If the characters of the bar code symbol are all decoded successfully, the decoding process terminates and an indicator of a successful read (such as a green light and/or audible beep) is provided to the user. Otherwise, after a period of time, the decoder aborts operation of the decoding algorithm on the first scan data, receives the next scan, and performs another decode operation, and so on, until the scan data is decoded according to symbology specification into a binary representation of the data originally encoded in the symbol, and to the alphanumeric characters so represented. Alternatively, the parameters of the decoding algorithm may be changed, e.g. thresholds of signal strength, and an attempt is made to decode the same first scan data once again, before using other scan line samples.

The binary data representing the decoded characters is communicated to a host computer by an interface cable or wireless communication link. The interface cable may be a "smart cable" such as that described in U.S. Pat. Nos. 5,664, 229 and 5,675,139, the contents of which are hereby incorporated by reference.

In automatic identification and data capture (AIDC) industry, certain module form factors, i.e., specific space allocations assemblies or devices having known functionalities, have become standards. The PC card or compact flash card is one such example in the portable computer industry.

SUMMARY OF THE INVENTION

1. Objects of the Invention

Accordingly, it is a general object of this invention to provide a single integrated module including distinct RF transceivers and optionally an interface to a video camera, or auto ID reader, all mounted on a common support, especially on a standard form factor such as a compact flash card for use in mobile computers.

It is another object of this invention to provide a module utilizing common baseband digital signal processing circuitry for an audio video data processor and a radio transceiver.

2. Features of the Invention

In keeping with the above objects and others which will become apparent hereafter, one feature of the present invention resides, briefly stated, in a dual radio frequency (RF) transceiver and a audio video data processor both supported on a common support having a predetermined form factor. Each RF transceiver is operative for communicating with a computer network, through different communications channels such as (i) a wireless LAN, and (ii) a WAN, GPRS, CDPD, or GSM cellular telephone network. The auto ID reader is operative for sensing encoded data on a label or card, such as a identification card, and for imaging and/or reading the encoded data of a bar code symbol.

In a preferred embodiment, electrical components for the RF transceivers and the auto ID reader are mounted on a printed circuit board in the form of a Compact Flash module. These components generate digital signals corresponding to the RF signal data and the encoded data. A single ASIC is supported by the module and receives and processes these digital signals, and outputs the processed signals through a common interface to the host computer.

The present invention provides a RF communications module for video data comprising:

a) a support having a predetermined form factor; b) a first radio frequency (RF) transmitter for local area network communication supported by the support, and operative for transmitting the data according to first communications standard; c) a second radio frequency (RF) transmitter for wide area network communications supported by the support, and operative for transmitting the data according to second communications standard different from the first standard; d) a common baseband processor coupled to said first and second transceivers for processing a baseband signal to or from each transceiver; and e) an image processor supported by the support, and operative for comprising video image data provided to said module and transferring such compressed data to the baseband processor for transmission by one of said transmitters. Audio PCM . . .

FIG. 1 is a block diagram of a dual RF transceiver and an image processing circuit together with a single IC baseband processor circuit in accordance with this invention;

DETAILED DESCRIPTION OF THE PREFERRED EMBODIMENT

Details of the present invention will now be described, including exemplary aspects and embodiments thereof. Referring now to the drawing, reference numeral 100 generally identifies a block diagram of a card or module according to this invention. Card 100 includes a first RF subassembly 10 having a wireless data transceiver for emitting RF energy via an antenna 21, 22 to communicate with a remote base station (not shown) associated with a computer network. The RF subassembly 10 may use any low power, communications protocol, and is operative for transmitting video data captured or collected by the mobile unit directly to the base station in a wireless local area network and thereby to a wired network. Module 100 also includes a second RF subassembly 11 having a wireless data transceiver for emitting RF energy via an antenna 23, to communicate with a remote base station (not shown) associated with a computer network. The RF subassembly 11 may use any other low power, communications protocol, and is operative for transmitting data collected by the mobile unit directly to the base station and thereby to the network.

Module 100 may further include a video input 12 from an imager (not shown). The ASIC 13 will provide the hardware interface to the imager. It will also perform low level signal processing such as digitization. The ASIC 13 is connected by a bus 17 to a processor chip 14, flash memory 18, and RAM19.

The AD6522 (or similar) a higher MIPS Version, dual processor chip 14 will perform the bulk of the image processing algorithms via the integrated DSP 15. These processes involve image compression and coding in much the same manner that is done for GSM or Voice-over-IP on this architecture. The integrated MCU 16 will assembly the communication frames for wireless transmission. The fragmentation of the payload for this communication frame will be dependent on the wireless media that is available at the time. Multi-resolution (e.g. wavelet) compression is used in order to deliver the image to the final destination in an optimized manner. For example, when using slower WWAN networks, a lower resolution image may be transmitted. The multi-resolution compression will also take into account other parameters form the application layer software. For example, if the remote correspondent has only a small black and white screen, the DSP 15 will produce a low resolution image payload for transmission. A terminal and display are accessible via the host interface 17. Specific software drivers (e.g. Compact Flash, USB, PCMCIA, etc.) can provide the host communications. The MCU will optimally format the image dependent on the display driver on the host side.

A key feature of the present invention is the use of a common DSP core 15 for each of the radios, thereby eliminating the duplication of the same or similar circuit elements for each radio.

NetMeeting from Microsoft and Proshare from Intel are two examples of commercially available products for video conferencing applications over an Internet communications link. These are essentially expensive IP based video telephones.

The Quarter Common Intermediate Format (QCIF), which measures 176 by 144 pixels, is a popular display standard for mobile devices such as 3G phones and wireless PDA that incorporate video capabilities. The Consultative Committee for International Telegraph and Telephone (CCITT) published the H.261 JPEG standard for video compression and the International Telecommunications Union (ITU) publishes the H.263 video conferencing standard. The International Standards Organization (ISO) publishes the MPEGx video compression standards. Each of these utilizes the Discrete Cosine Transform (DCT) for compression images. DCT process 8×8 pixel blocks at a time to produce 64 coefficients, which are then quantized. The compression is based on the fact that most images produce a small enough coefficient, whereby the quantization results in zero.

The MPEG4 video compression standard has lately become very popular because chips dedicated to the function have been commercially available. For example, Samsung utilizes the Toshiba TC35273XB MPEG4 chip in its latest CDMA2000 1x phones.

MPEG4 requires approximately 3.7 billion operations per second (BOPS) to encode QCIF video at 15 frames per second. Therefore, emerging multi-media processors embed an MPEG4 co-processor engine for compressing and decompressing the video signals. Some designs utilize an external co-processor such as the Toshiba chip, which consumes 1.3 mW per MHz when encoding 15 frames per second at 20 MHz.

The MPEG4 standard includes both audio and video compression and multiplexing. Generally, the audio and video streams are independently compressed. The algorithm then appends synchronization markers to each stream after a predetermined number of processed packets so that the receiver can decode, reassemble, and re-synchronize them for play back. The MPEG2 and H.263 standards specify markers after a fixed number of coded blocks rather than after a fixed number of packets.

The various standards utilize different approaches for synchronizing the audio and video streams during encoding and playback. Most standards append "time stamp" information to the data frames of both the audio and video streams so as to indicate the relative time position of the data in each frame. If the audio, video, or both frames become lost during transmission, the decoder is able to look ahead for the next available set of frames that can be synchronized for replay.

For example, the H.225.0 sub-section of the H.323 standard defines the formatting of the video, audio, data, and control streams for transmitting over the network, and reverses the process for the corresponding streams that it receives. As part of audio and video transmissions, H.225.0 uses the packet format specified by the Internet Engineering Task Force (IETF), Real Time Protocol (RTP), and Real-time Control Protocol (RTCP) specifications for organizing and framing the packets, adding sequencing information and handling error correction with respect to the packet ordering.

The base station emits an RF signal which is detected by the antenna 21, 22 or 23 in the respective radios in the module. A second antenna may also be deployed in each respective radio in the module for antenna diversity, and when we refer to the "antenna" we shall mean either antenna 21 or 22, or 23 or 24. The received RF signal, for communications protocol synchronization or acknowledgement purposes, is conducted to the wireless transceiver 10 or 11 which performs RF demodulation. The analog baseband signal is processed in a signal processor.

As described so far, the RF transceivers 10, 11 share the common baseband processor 15. Various aspects of the processor 15 may be implemented in digital circuitry, or in computer hardware, firmware, software, or in combinations of them. Apparatus of the invention may be implemented in computer products tangibly embodied in a machine-readable storage device for execution by a programmable processor, or on software located in memory. Although a single chip 14 is preferred for processor 15, the foregoing techniques may be performed, for example, by a single micro processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable digital signal processor coupled to receive data and instructions from, and to transmit data and instructions to, a data storage system, at least input device, and at least one output device. Each computer program may be implemented in a high-level procedural or object-oriented programming language, or in assembly or machine language if desired; and in any case, the language may be compiled or interpreted language. Suitable processors include, by way of example, both digital signal processors, or general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICs).

It will be understood that each of the elements described above, or two or more together, also may find a useful application in other types of constructions differing from the types described above.

While the invention has been illustrated and described as embodied in an IC used in a dual radio frequency transceiver in a module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A RF communications module for audio and video data comprising:
   a) a support having a predetermined form factor;
   b) a first radio frequency (RF) transmitter for local area network communication supported by the support, and operative for transmitting the data according to first communications standard;
   c) a second radio frequency (RF) transmitter for wide area network communications supported by the support, and operative for transmitting the data according to second communications standard different from the first standard;
   d) a common baseband processor coupled to said first and second transmitters for processing a baseband signal to or from each transmitter; and
   e) an image processor ID reader supported by the support, and operative for compressing video image data provided to said module and transferring such compressed data to the baseband processor for transmission by one of said transmitters.

2. The module of claim 1, wherein the support includes a printed circuit board on which electrical circuit components for the RF transmitters are mounted.

3. The module of claim 1, wherein the RF transmitters and the video imager reader generate digital signals corresponding to the RF demodulated data and the video encoded data respectively, and wherein the IC receives and processes each of the digital signals using a single fast Fourier transform circuit.

4. A module as defined in claim 1, wherein the first transmitter uses a local area network communications standard, and the second transmitter used a wide area network communications standard.

5. A module as defined in claim 4, wherein the auto ID reader is an imager for a two dimensional image of a field of view.

6. A mobile computer collection terminal, comprising:
   a) a hand-held housing;
   b) a support supported by the housing and having a predetermined form factor; and
   c) a first and a second radio frequency (RF) transceivers supported by the support, and operative for communicating with first and second RF base stations respectively associated with first and second computer networks for transferring data between the terminal and networks; and the
   d) an image processor ID reader supported by the support, and operative for compressing video image data provided to said module and transferring such compressed data to the baseband processor for transmission by one of said transceivers.

7. The data collection terminal of claim 6, wherein the form factor occupies a space for an SE 1200 scan engine.

8. The data collection terminal of claim 7, wherein the support includes a printed circuit board on which electrical circuit components for the RF transceivers and auto ID readers are mounted.

9. The data collection terminal claim 8, wherein each RF transceiver includes a first antenna, a second antenna, and a circuit for modulating and demodulating the RF signal.

* * * * *

UNITED STATES PATENT AND TRADEMARK OFFICE
CERTIFICATE OF CORRECTION

| | | |
|---|---|---|
| PATENT NO. | : 7,447,479 B2 | Page 1 of 1 |
| APPLICATION NO. | : 10/056408 | |
| DATED | : November 4, 2008 | |
| INVENTOR(S) | : Bridgelall | |

It is certified that error appears in the above-identified patent and that said Letters Patent is hereby corrected as shown below:

In Column 4, Line 57, delete "invention;" and insert -- invention. --, therefor.

In Column 8, Line 32, in Claim 6, insert -- the --, before "networks;".

In Column 8, Line 32, in Claim 6, after "and" delete "the".

In Column 8, Line 45, in Claim 9, after "terminal" insert -- of --.

Signed and Sealed this

Third Day of July, 2012

David J. Kappos
*Director of the United States Patent and Trademark Office*